(12) United States Patent
Hou

(10) Patent No.: US 12,722,356 B2
(45) Date of Patent: Sep. 1, 2026

(54) PREPREG MASTER ROLLS AND SLIT TAPE AND METHOD

(71) Applicant: WEB INDUSTRIES, INC., Marlborough, MA (US)

(72) Inventor: Grand Hou, Norcross, GA (US)

(73) Assignee: WEB INDUSTRIES, INC., Marlborough, MA (US)

( * ) Notice: Subject to any disclaimer, the term of this patent is extended or adjusted under 35 U.S.C. 154(b) by 670 days.

(21) Appl. No.: 17/010,736

(22) Filed: Sep. 2, 2020

(65) Prior Publication Data

US 2021/0070012 A1 Mar. 11, 2021

Related U.S. Application Data

(60) Provisional application No. 62/897,114, filed on Sep. 6, 2019.

(51) Int. Cl.
*B32B 5/26* (2006.01)
*B32B 23/10* (2006.01)
*B65H 35/02* (2006.01)

(52) U.S. Cl.
CPC ................ *B32B 5/26* (2013.01); *B32B 23/10* (2013.01); *B65H 35/02* (2013.01); *B32B 2260/023* (2013.01); *B65H 2301/4148* (2013.01)

(58) Field of Classification Search
CPC ..... B32B 5/26; B32B 23/10; B32B 2260/023; B65H 35/02
USPC .......................................................... 442/59
See application file for complete search history.

(56) References Cited

U.S. PATENT DOCUMENTS

| | | | |
|---|---|---|---|
| 4,151,031 | A | 4/1979 | Goad et al. |
| 4,883,700 | A | 11/1989 | Harpell et al. |
| 5,043,128 | A | 8/1991 | Umeda |
| 5,766,725 | A | 6/1998 | Hogenboom et al. |
| 8,163,122 | B1 | 4/2012 | Paul |
| 8,795,457 | B2 | 8/2014 | Rubin et al. |
| 9,248,613 | B2 | 2/2016 | Wilkerson et al. |
| 11,192,280 | B2 | 12/2021 | Ochi et al. |
| 11,597,168 | B2 | 3/2023 | Kawabe et al. |
| 2007/0175572 | A1 | 8/2007 | Rubin et al. |
| 2010/0028616 | A1 | 2/2010 | Yamanouchi et al. |
| 2011/0162777 | A1 | 7/2011 | Youn et al. |
| 2015/0367584 | A1 | 12/2015 | Daton-Lovett |
| 2016/0185094 | A1 | 6/2016 | Hou et al. |
| 2016/0368256 | A1 | 12/2016 | Witte et al. |
| 2018/0186101 | A1 | 7/2018 | Keda et al. |

(Continued)

FOREIGN PATENT DOCUMENTS

| | | | |
|---|---|---|---|
| CN | 104228087 | A | 12/2014 |
| EP | 0319895 | A2 | 6/1989 |
| EP | 2247447 | B1 | 10/2015 |

(Continued)

OTHER PUBLICATIONS

Gardiner, G., "The Spread of Tow", Composites World, Jun. 2018, pp. 30-36.

(Continued)

*Primary Examiner* — Vincent Tatesure
(74) *Attorney, Agent, or Firm* — Hoffmann & Baron LLP; Edward K Welch, II

(57) ABSTRACT

Thick thermoset prepreg sheets and slit tapes and methods and apparatus for the production thereof.

22 Claims, 3 Drawing Sheets

(56) References Cited

U.S. PATENT DOCUMENTS

| | | | |
|---|---|---|---|
| 2019/0061279 A1 | 2/2019 | Hou et al. | |

FOREIGN PATENT DOCUMENTS

| | | | | | |
|---|---|---|---|---|---|
| JP | 857074117 | A | | 5/1982 | |
| JP | H01320146 | A | | 12/1989 | |
| JP | H02115236 | A | | 4/1990 | |
| WO | 9112136 | | | 8/1992 | |
| WO | WO-2005033390 | A2 | * | 4/2005 | .............. C08J 5/248 |
| WO | WO-2015191354 | A1 | * | 12/2015 | ......... B29C 35/0261 |
| WO | 2019101785 | A1 | | 5/2019 | |
| WO | 2019122073 | A1 | | 6/2019 | |
| WO | 2019235237 | A1 | | 12/2019 | |
| WO | 2020071466 | A1 | | 4/2020 | |

OTHER PUBLICATIONS

"HexPly Prepreg Technology", Hexcel Corporation Publication No. FGU 017c, Jan. 2013.

International Search Report and Written Opinion issued with respect to PCT/US20/94079 dated Dec. 3, 2020 (International PCT application corresponding to instant application).

European Supplementary Search report and Written Opinion of corresponding European Patent Application No. EP 20860527 issued on Aug. 1, 2023.

* cited by examiner

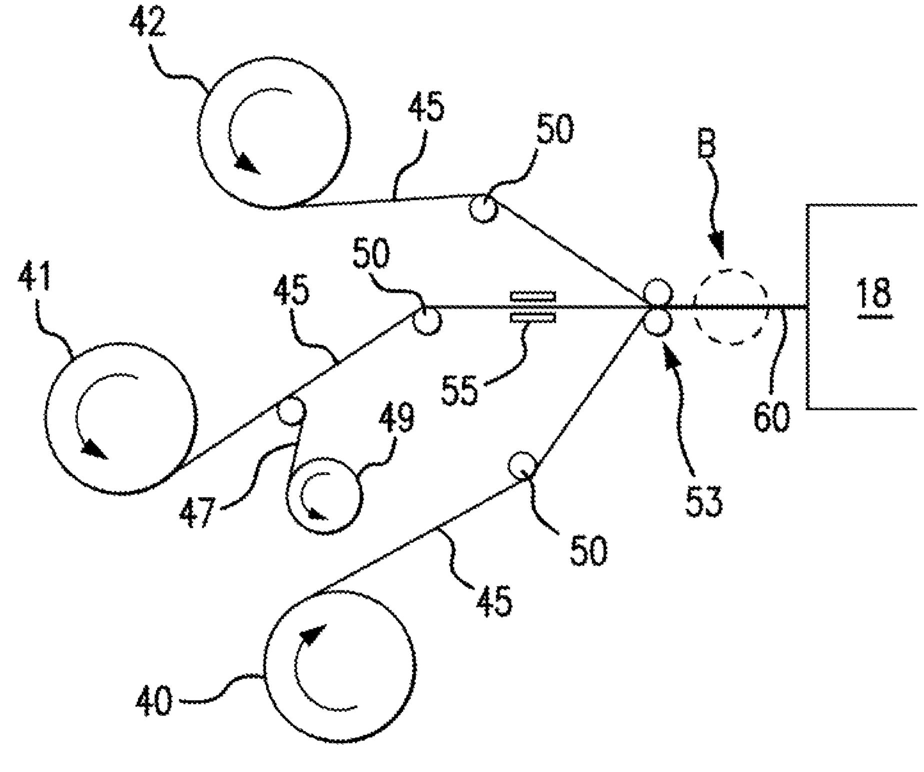
FIG. 3
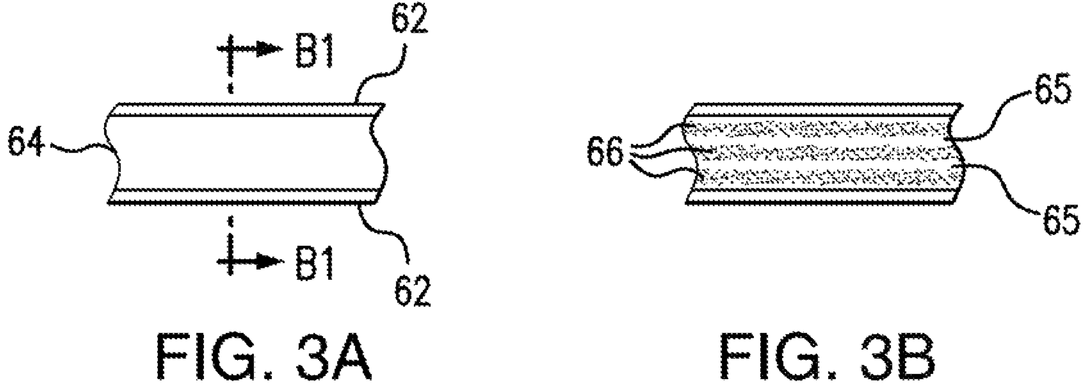
FIG. 3A
FIG. 3B

PREPREG MASTER ROLLS AND SLIT TAPE AND METHOD

The present application claims the benefit of prior U.S. Provisional Patent Application No. 62/897,114, filed Sep. 6, 2019, entitled "Prepreg Master Rolls and Slit Tape and Method," the contents of which are hereby incorporated herein by reference in their entirety.

FIELD OF THE INVENTION

The present application is directed to a method of preparing thermoset prepreg master rolls and thermoset prepreg slit tape as well as the products thereof. Specifically, the present application is directed to a method of preparing thermoset prepreg master rolls and slit tapes of enhanced thickness without compromising the qualities of the slit tape, especially without increasing the likelihood of voids, poor wetting of fibers and the like, as well as the resulting master rolls and slit tapes, wherein the method comprises mating two or more sheets of thermoset prepreg sheet material, most especially unidirectional thermoset prepreg sheet material, to form the thick master rolls and then slitting the formed thick master rolls to form the thick slit tape.

BACKGROUND

Advances in composite technology have had a marked impact on product design and engineering and, ultimately, manufacture. Early methods involving hand lay-up of fibrous materials and sheets with the subsequent impregnation of the laid up materials and, subsequently, the laying up of pre-impregnated fibrous sheets and mats followed by compression forming and curing saw rapid adoption and exploitation of these composite materials and technologies in many fields. However, while useful for many applications, the slow methodical build-up of the layers of materials is very labor intensive, oftentimes involves the use of hazardous chemicals and, more importantly, employs unstable materials and/or materials having limited working time. Thus, while a marked advance in the industry, their applications were still limited and costly.

Subsequent advances in composite materials and technology led to continuous manufacturing techniques. Perhaps the most notable of these techniques is filament winding wherein a continuous tow of certain fibrous materials were pulled though a bath of a curable material to impregnate the same with the curable material, the wet tow is then wound about a mandrel to form the desired part, preferably with some measure of immediate cure (oftentimes a UV cure) to attain a green state so as to prevent excessive flow of the resin material and maintain the fiber placement during the winding process following which the wound structure is fully cured. However, these operations are very slow and time consuming owing, in large part, to the narrow width of the tow. More importantly, these processes are very capital intensive as the whole of the operation, from preparation of the curable composition to the wetting of the tow of fiber material and, subsequently, to the formation of the part itself, all had to be performed in the same immediate vicinity of one another, typically on the same floor space.

Continued advances in both manufacturing and materials technology led to the ability to prepare cut sheets and, subsequently, master rolls of "green state" or partially cured prepreg materials: the latter in the form of continuous strips and sheets of tows of woven fibers or unidirectional, parallel fibers, most typically glass or carbon fibers, impregnated with a thermoset/thermosetting resin, especially epoxy, BMI or polyimide resins. These prepreg materials are generally formed on or have applied thereto a support sheet material, typically paper or a polymer film, especially a polyolefin film, which also serves as a separator or liner material to prevent successive layers, in the case of stacked cut sheets, or successive windings, in the case of master rolls, of the prepreg materials from contacting and adhering or melding to one another. The so formed cut sheets and master rolls of prepreg materials are then stored and shipped to the ultimate end-user for use in manufacturing composite structures. Owing to the unstable nature of the thermoset/thermosetting resin material, these cut sheets and master rolls are stored and maintained at significantly reduced temperatures, oftentimes at or below freezing, until use or further processing so as to prevent or at least significantly retard premature curing of the thermoset resin. The inherent cost advantages and focus on centered expertise (e.g., prepreg manufacturers concentrated on the chemistry and manufacture of the prepreg materials and the product manufacturers concentrated on the layup process) proved beneficial all around. No longer was it necessary for the ultimate composite product manufacturer to invest in the capital equipment, consumable materials, overhead, spatial requirements, and technical expertise and personnel to make the prepreg materials.

Early on, master rolls of thermoset prepreg strip or sheet materials were manufactured in standard widths that were then used in AFP and ATL apparatus to make the commercial products. This was acceptable as many applications had very similar demands and requirements, e.g., baseball bats, golf clubs, hockey sticks, lacrosse sticks and the like can all be made with generally the same width of tape, largely because the demands are similar and the need for differentiation less. However, higher tech end-use applications, especially aerospace applications, required narrower strips and, oftentimes, strips of different widths at different points in the layup process. Initially apparatus were developed to produce strips of the desired widths and, subsequently, slitters were incorporated into the AFP/ATL layup heads whereby the master strip material was slit into narrow tapes just prior to being laid down. Subsequently, such AFP/ATL apparatus were modified to source the prepreg tape from multiple spools, oftentimes a carriage of spools, of prepreg tapes of different widths.

These advances enabled greater and greater opportunity for the use of slit prepreg tape in more and more high tech applications, particularly aerospace applications; however, owing to these new applications, greater and greater performance requirements and enhanced properties as well as yet narrower and narrower widths were demanded of the prepreg tape materials. More and more applications required tapes of widths of less than two inches (5.08 centimeters), often less than one inch (2.54 centimeters) and as narrow as one-eighth inch (0.317 centimeters) or less. Additionally, such narrow strips required physical properties that allowed for high speed application without the tows twisting or breaking. Concurrently, it became increasingly critical to avoid defects such as voids in the slit tape materials as well as in the laydown process. The former required a multi-parameter advancement and development of the composition and processing of the matrix resins and prepreg formation, respectively. The latter required greater precision in the lay down process combined with extremely tight tolerances with respect to width variation in the slit tape.

These advanced requirements have been attainable through the development of apparatus and processes for the production of slit tapes: prepreg tapes of wide and narrow widths formed by the slitting of wide sheets of thermoset prepreg to form narrow strips, commonly referred to as slit tape, through sophisticated slitting and winding apparatus concurrent with further advances in matrix formulations and prepreg sheet manufacture and processing.

Although prepreg materials and their manufacture as well as the properties thereof are based upon a myriad of variables, two key variable are the ratio of the thermoset/thermosetting resin matrix to the fiber content as well as the degree and sufficiency of impregnation of the fibers with the resin across the thickness of the material. Parameters affecting these variables typically include temperature, pressure, viscosity, fiber tension, density of the fiber bundles and the number of fibers/fiber bundles in a given tow. Through years and years of development, it has now been found that with current thermoset/thermosetting resin matrices, in order to attain suitable prepreg material possessing the requisite physical properties in their cured state as well as prepreg materials free or substantially free of voids along with proper wetting, it is important, if not necessary, to have fiber densities having an aerial weight of from about 30 $g/m^2$ to about 300 $g/m^2$, even up to 400 $g/m^2$ or more, preferably about 190 $g/m^2$, and a resin content of from 30 to 40, preferably about 35, weight percent. The resulting prepreg materials have a thickness of from about 0.001" (25.4 μm) to about 0.015" (381 μm), even up to 0.02" (500 μm) or more, preferably from about 0.004" (101.6 μm) to about 0.012" (304.8 μm), more preferably from about 0.006" (152.4 μm) to about 0.009" (228.6 μm). While the production of lower fiber aerial weight prepreg materials does not typically encounter impregnation issues, it oftentimes results in prepreg materials having numerous and substantial gaps in the fiber across the width of the prepreg due to difficulty in and in ensuring a good, relatively even, spread of the low aerial weight fibers across the width of the prepreg being formed. These gaps create issues both with respect to the integrity of the formed prepreg and during slitting, particularly adversely affecting the ability to maintain slit tolerances. On the other hand, higher fiber aerial weight prepreg materials typically do not have such gap issues; rather, they suffer from more inconsistent and/or low impregnation levels due to the more difficulty in ensuring infiltration of the resin and adequate wetting of the fibers. Consequently, these prepreg materials suffer from poor stability, especially in slit tape form for ATL/AFP process. While lower viscosity thermoset matrix resins could enable better infusion and wetting with higher fiber densities, the properties of the resulting prepreg materials suffer and/or the prepreg is cost prohibitive. Specifically, they tend to be of inconsistent quality rendering them unsuitable for the intended end-use applications, especially in high tech and aerospace applications. Additionally, prepreg materials manifesting poor impregnation levels and/or inconsistent impregnation levels suffer from the inability to attain the tight tolerances required of slit tapes: namely tolerances of no greater than 0.01 inches (254 micrometers), preferably no more than 0.005 inches (127 micrometers).

No better proof of the advantages and advances of prepreg materials and, most especially, AFP/ATL processes exist than the Boeing 787 aircraft which is largely manufactured of slit tape materials, including such significant parts as the fuselage and wings and other airframe components. However, there is still room for improvement, particularly with respect to speed with which such components are manufactured. Because of the aforementioned limitations on slit tape materials, particularly their thickness, manufacturing times are extremely long as one layer is applied after another, slowly building to thicknesses of from 0.125" (0.32 cm) to over 4" (10.16 cm).

Certainly, manufacturing and manufacturing efficiencies would be greatly improved if thicker prepreg materials and, especially slit tapes, could be prepared without the risks and concerns associated with poor physical properties, increased voids and loss of wetting, loss of width tolerances, etc.

SUMMARY

According to the present teachings there is provided a method for the production of thick thermoset prepreg master rolls which method comprises aligning, one over the other along their length, and mating two or more sheets of thermoset prepreg, particularly unidirectional prepreg sheet material, and then rerolling the so formed thicker prepreg sheet material. Generally speaking, the thickness of the so formed thermoset prepreg master rolls is such that such thickness(es) cannot be attained by present day single sheet prepreg sheet making processes or if attainable, are only attainable with a concomitant compromising of the physical the properties and integrity of the prepreg sheet material, particularly with respect to the creation of voids and poor wetting of the fibers.

Where just two sheets are to be mated and each has a backing or liner on one surface thereof, the two sheets are simply aligned and mated with the exposed surface of the prepreg sheet materials facing one another, preferably with a slight pressure and/or low heat applied across the width of the mated sheets, and rewound. If either or both sheets have a backing or liner on both surfaces, then the backing or liner must first be removed from the surface(s) to be mated. Where a third, fourth, etc. sheet of prepreg material is to be mated, then the liner must first be removed from both surfaces of those internal layers before mating. In these instances of mating more than two prepreg sheet materials, all layers may be mated simultaneously or sequentially, similarly, the removal of the liner may be concurrent or may be sequential at or just prior to the mating point so as to lessen the risk of artifacts attaching to the exposed surface and being trapped between the layers. Although the natural tack of the thermoset matrix will affix the two surfaces to one another, it may be desirable, especially if there is concern that the tack may be insufficient, to heat the mating surface of one or each sheet to be mated to enhance the tack before mating.

Depending upon the width of the master sheet materials, the so formed thick prepreg master sheet materials may be used as is, especially in an AFP/ATL apparatus that has a slitter integrated into it or, most likely, subjected to a slitting process to form slit tape which is then wound. In the latter case, the slitting may be done with or without the backing or liner material attached. If done without, then the liner is removed, the prepreg slit and a new liner attached before winding the slit tape: this is particularly beneficial if the backing material is a paper backing. If done with the liner attached, particularly where the liner is a polymer film liner, the master sheet material is slit to size and wound.

In accordance with a second embodiment of the present teaching, thick prepreg sheet materials are formed as in the preceding embodiment except that the formation of the master rolls of the thick prepreg sheet material is bypassed. Instead, the thick sheet of prepreg material is passed directly to a slitting apparatus where it is slit and wound or, in the case of an integrated manufacturing facility, fed directly to one or more AFP/ATL apparatuses for part manufacture. It is also to be appreciated that the thick prepreg sheet material may be fed directly to an AFP/ATL apparatus that applies it as is or is capable of slitting the tape as it is laid down.

The present teachings are also directed to master rolls of the thick prepreg sheet material as well as thick prepreg slit tape prepared from said thick prepreg sheet material. These thick prepreg sheet materials are distinguished from thick prepreg sheet materials made of the same thickness in a conventional prepreg sheet manufacturing process in that they have a discrete layer of the resin matrix intermediate two resin infused fiber layers. Additionally and advantageously, the thick prepreg sheet and slit tape materials produced in accordance with the present teaching have less instances of voids and lack of wetting as compared to conventional prepreg sheets and slit tapes produced in the same thickness from the same matrix resins and fiber bundles.

These and other aspects, details and benefits of the present teachings will be more fully described in and apparent from the specification below.

BRIEF DESCRIPTION OF THE DRAWINGS

The accompanying drawings which form a part of the specification are to be read in conjunction herewith. Like reference numerals are employed to indicate like parts in the various views.

FIG. 1 is a cross-sectional view of the mated thick prepreg sheet material at A1-A1 of FIG. 1A.

FIG. 3 is a schematic side view of an apparatus for concurrently mating three continuous sheets of prepreg material with liner removal.

FIG. 3A is a close-up view of the mated thick prepreg sheet material of FIG. 3 at B.

FIG. 3B is a cross-sectional view of the mated thick prepreg sheet material at B1-B1 of FIG. 3A.

DETAILED DESCRIPTION

Figure 1:
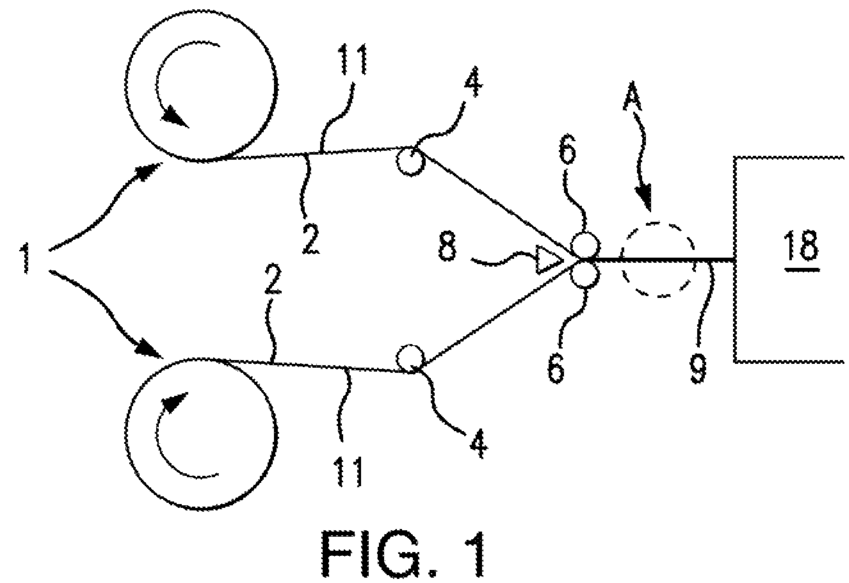
FIG. 1 is a schematic side view of an apparatus for mating two continuous sheets of prepreg material.

As used herein and in the appended claims, the term “conventional” when used in relation to prepreg sheet and/or tape means a prepreg sheet or tape made in a manner conventional as of the date of the discovery of the present teaching where the liquid matrix resin is combined and infused into a plurality of fibers/fiber bundles or a fabric, typically on a backing or support, and excess resin removed to produce continuous sheets and tapes of defined widths and thickness. Backing or support materials are commonly paper or a polymer film, especially polyolefin, polyamide, polyester, vinyl polymer, and polyacetate films. Specific exemplary polymer films include polyethylene (PE), including low density polyethylene, high density polyethylene, and linear low density polyethylene; polypropylene, biaxially oriented polypropylene, polyethylene-propylene copolymer, polytetrafluro-ethylene, polyvinyl acetate, polyvinyl chloride, polyvinyl alcohol, ethylene vinylacetate (EVA), EVA-PE blends, polystyrene, biaxially oriented polystyrene, polyethylene terephthalate, polyamide 6, polyamide 6,6, and cellulose triacetate, just to name a few. Most preferably, the polymer film is a polyolefin, especially polyethylene. Generally speaking conventional prepreg sheets and slit tapes will have the physical characteristics mentioned above in the Background.

As noted above, conventional prepreg sheet materials are formed on a backing or support layer. Sometimes the original support layer or backing is replaced with a liner, most typically a polymer liner. Additionally, it is common to place a liner on the opposite surface of the prepreg sheet material during or subsequent to the prepreg formation process to protect the exposed surface of thermoset resin. For convenience, in an effort to avoid referencing backings, supports and liners and their iterations, the term “liner” as used herein and in the appended claims is intended to embrace all three, particularly as context allows.

As used herein and in the appended claims, the term “continuous” when used in reference to the prepreg sheet material and slit tape refers to long lengths of such materials for either immediate use/processing, such as slitting in the case of the sheet materials, or wound for storage and/or transportation. Typically, continuous prepreg sheets and tapes to be slit will have lengths of from at least about 10 meters, more typically 25 meters, up to about 100 meters or more, and with newer technologies now typically from at least about 100 meters, more typically 250 meters, up to 1000 meters and more, and widths of from about 0.1 meters, more typically 0.35 meters, to 2.5 meters, preferably from about 0.7 meters to about 1.5 meters. Meanwhile continuous slit tapes, depending upon their widths and whether they are coil wound or transverse wound will have lengths similar to those of the sheet materials up to, typically in excess of, 200 meters or more, more typically up to 1500 meters or more, or well in excess of 1000 meters, more typically up to or in excess of 3500 meters, even up to and exceeding 6000 meters, respectively. Typical widths range from about 0.1 cm to about 10 cm or more, more typically from about 0.3 cm to 10 cm. Additionally, although specific reference herein is made to prepreg sheet materials of unidirectional carbon fibers impregnated with curable epoxy resins, it is understood that the present teachings are not so limited. Indeed, the present teachings are equally applicable to other prepreg sheet materials, including those made of glass fibers, polymer fibers, and combinations of fibers, all of which may be unidirectional along the length or angled relative to the length of the tape, woven, non-woven, etc., as well as those wherein the matrix resin is any of number of curable or thermosetting matrix resins including, but not limited to epoxies, cyanate esters, bismaleimides, phenolics, polyimides, and the like. Most especially the present teachings are particularly suited for and will be discussed with respect to prepreg sheets and tapes of unidirectional carbon fibers in an epoxy thermoset resin matrix.

As used herein and in the appended claims, the term “thick” and “thicker” when used in reference to prepreg sheet materials and slit tapes refers to such sheet materials and tapes formed in accordance with the teaching of the present disclosure.

Finally, the use of the terms “align” and “aligned” in reference to the positioning of the master sheet materials by the alignment or guide rollers means that the master sheet materials are positioned relative to one another so that they effectively overlay one another along their length, especially at the point. Where two master sheets of the same width are to be mated, the alignment will position the master sheet materials so that the edges of each directly or as closely as reasonably possible align one over the other.

While few details are provided herein with respect to the elements of the apparatus as well as the apparatus as a whole, all of the elements are known and commercially available: it is their combination and orientation as well as the use thereof that is novel. Other apparatus referenced herein are well known and commercially available; for example, slitting and winding apparatus are well known.

According to the present teachings there is provided:

- a method for the production thick prepreg master sheet material wherein two or more conventional prepreg sheets are aligned and mated to form a thick master sheet material;
- a method for the production master rolls of thick prepreg master sheet material wherein two or more conventional prepreg sheets are aligned and mated to form a thick master sheet material which is then wound to form the rolls;
- a method for the production thick prepreg slit tape wherein thick master sheet material is slit into tapes of desired widths and either directed to use or wound for subsequent use;
- an apparatus for the production of thick master sheet from conventional master sheet;
- thick prepreg master sheet materials;
- master rolls of thick prepreg master sheet materials; and
- thick prepreg slit tapes.

Another aspect and benefit of the present teaching is that one is able to customize the thickness of the thick prepreg master sheet material and the resultant thick prepreg slit tape by the selection of the number and thicknesses of the conventional master sheet materials used in the production thereof. In this respect, it is to be appreciated that the description above of typical thicknesses, particularly the upper limits thereof, is primarily based upon the maximum thicknesses that can be suitably and efficaciously attained given the aforementioned concerns with resin infiltration and wetting. However, thicknesses of less degree can readily be produced without or with less concern for the previously discussed problems and shortcomings and, thus, are readily suitable for use in the practice of the present teachings.

Figure 1A:
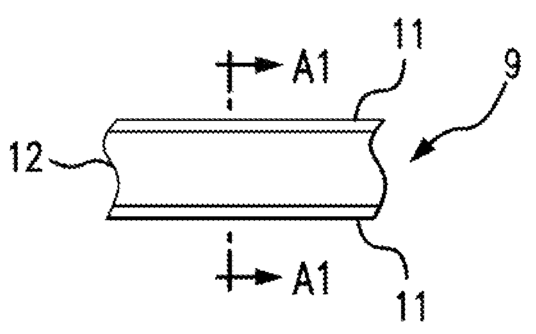
FIG. 1A is a close-up view of the mated thick prepreg sheet material of FIG. 1 at A.

For convenience and ease of understanding, the methods, apparatus and products of the present teachings are now explained in conjunction with reference to the appended Figures, which are incorporated herein, FIG. 1 presents a side-view schematic of the simplest of the methods for producing thick prepreg master sheet materials. Here two master rolls 1 of conventional thermoset prepreg master sheet materials 2, each having aligner 11 on one surface, as more clearly shown in FIG. 1A and FIG. 18, are aligned by a plurality of alignment rollers 4 and mated at a pair of pinch rollers 6. Optionally, as shown in FIG. 1 a heater element 8 is positioned to warm the thermoset resin to enhance the tackiness thereof. In those methods and apparatus where the heating element is present, the extent and duration of the heating is limited to improve the tackiness of the thermoset resin and, in any event is controlled to ensure that the temperature does not accidently initiate cure of the thermoset resin. Generally, the resin is heated to no more than 120° C., preferably no more than 100° C., more preferably no more than 65° C., most preferably no more than 50° C., again depending upon the activation temperature of the cure catalyst/activator for the thermoset resin. Furthermore, although FIG. 1 shows both prepreg sheet materials being subjected to the heating, it is to be appreciated that only one sheet need be heated to benefit from the increased tackiness.

As previously noted, the two prepreg sheet materials are mated and pass through a pair of pinch rollers 6. The pinch rollers help ensure proper face to face mating across the full width of the sheet materials. The pinch rollers are spaced to provide a slight interference fit or may be constructed to allow the upper pinch roller to float whereby the weight of the roller itself presses down on the mated master sheet materials. Additionally, the pinch rollers may be controlled to impart a force whereby the two master sheet materials are pressed into one another. Whether weight induced or pressure induced, the force acting upon the mated sheet materials in the pinch rollers is generally from about 1 psi to about 4 psi, though lesser force is sufficient where the tack of the thermoset is high. Higher forces are possible, however, are discouraged to avoid undesired resin flow.

Figure 1B:
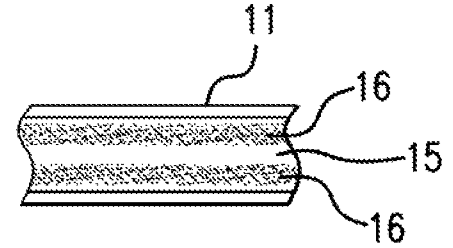

The resulting thick master sheet material 9 is shown in FIGS. 1A and 1B wherein a liner 11 is present on both surfaces of the thick prepreg sheet material 12. Although accentuated, FIG. 18 presents a cross-sectional view of the master tape wherein a distinct thermoset resin layer 15 is present intermediate the two resin infused unidirectional fiber layers 16.

Finally, FIG. 1 shows the thick prepreg master sheet advancing to Box 18 for further processing. Such further processing could be merely the winding of the thick prepreg master sheet on a core element to form a master roll, with or without removing one of the remaining liners. Alternatively, the thick prepreg master sheet material could be advanced to a slitting apparatus for converting the wide master sheet into a plurality of slit tapes of one or more widths. Further still, the master sheet may be advanced to a manufacturing process where the master sheet material is fed to an ATL apparatus or AFP apparatus, particularly one with an integrated slitter, for building a composite structure.

Figure 2:
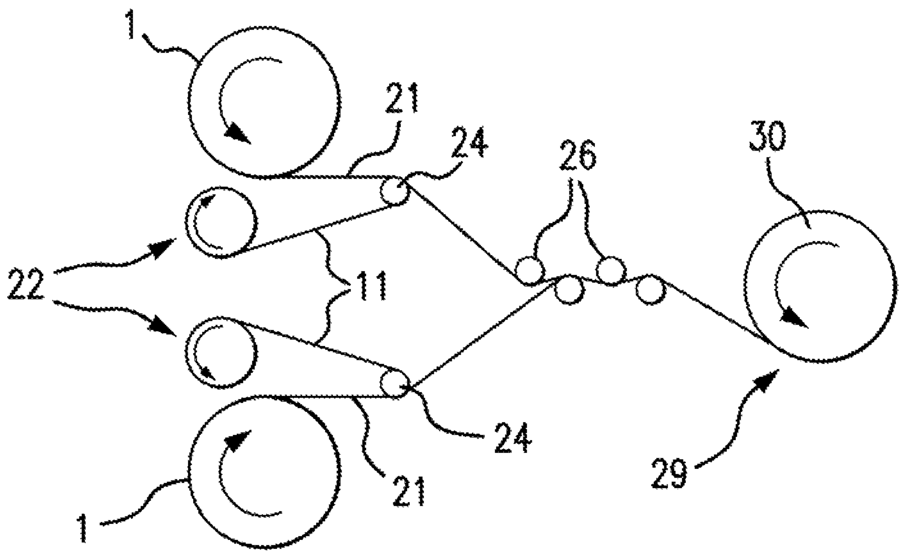
FIG. 2 is a schematic side view of an alternate apparatus for mating two continuous sheets of prepreg material with the removal of a liner from each.

FIG. 2 presents a side-view schematic of a similar apparatus and method to that shown in FIG. 1 except in this instance the conventional prepreg sheet materials 21 have a liner on each surface of the thermoset prepreg master sheet material. In this instance, it is necessary to remove the liner from the mating surfaces before the two master sheets are mated. Here two take-up winders 22 for the liner are provided with the liner separating from the master sheet material at a alignment rollers 24.

This apparatus also employs a different means to press the sheets of master sheet material into one another. Specifically, in this apparatus the master sheet materials are mated at a set of serpentine rollers 26. Here the mated sheets pass through the serpentine rollers where the serpentine-like or wave-like motion of the mated sheets through the rollers is occasioned by the offsetting of the serpentine rollers, i.e. the extent to which the lower surface of the upper roller elements extends below the upper surface of the lower roller elements. This serpentine-like or wave-like motion of the mated sheets through the serpentine rollers creates a compression in the mated materials which serves to press the mated surfaces of the prepreg master sheet material to one another. Although not necessary, it is also contemplated that one or more of the rollers is associated with a weight or a pneumatic or spring activated element which acts upon and forces one or more of the roller against the mated materials. As shown FIG. 2, the serpentine or wave motion of the mated materials through the serpentine rollers is fairly shallow, thereby exerting a lower pressure on the mated sheet materials. However, it is to be appreciated that the offsetting of the rollers can be made more pronounced so as to create a wave action having an higher amplitude whereby a higher pressure or force is imparted against and to the mated sheet materials.

For the purpose of exemplification, the apparatus of FIG. 2 does not incorporate a heating element to warm and make more tacky either or both of the mating surface(s) of the prepreg sheet material. However, it is to be appreciated that a heater element could be incorporate at or near the mating point of the master sheet materials or anywhere intermediate the mating point and the roller at which the liner is removed.

In the embodiment shown in FIG. 2 the formed thick prepreg sheet material is wound on a winder 29 to form master rolls 30 of the thick prepreg sheet material. Although not shown, if desired, one could also insert an additional liner removal apparatus and liner winder intermediate the serpentine rollers and the winding apparatus in order to remove one of the two remaining liners before winding the master roll. Of course, also as discussed above with respect to the apparatus and method of FIG. 1, the thick prepreg master sheet material of this apparatus could equally be fed directly to additional apparatus for subsequent processing and/or use rather than being wound as shown.

FIG. 3 presents a side-view schematic of an apparatus and method for producing thick prepreg master sheet materials from three master rolls 40, 41, 42 of conventional prepreg sheet material 45. In this particular depiction, each of the conventional thermoset prepreg master sheet materials 45 has a liner 11 on one surface. In the case of the master roll 41 sourcing the intermediate layer for the thick prepreg sheet material, it is necessary to remove the liner 47 prior to mating that sheet material with the other two sheet materials. As shown, the liner that is removed is taken up by winder 49. Of course, if any or all of the master sheet materials had a liner on both surfaces, it would be necessary to remove the liner from the other surface in the case of the middle roll of master sheet material 41 and from the mating surfaces of the other master sheet materials before mating. In these instances, there would be a liner removal apparatus and liner take-up winder intermediate those master rolls and the mating point for the sheet materials.

As with the embodiment of FIG. 1, the sheets of conventional prepreg sheet materials are aligned by a plurality of alignment rollers 50 and mated at a pair of pinch rollers 53, the same as or comparable to those described above. Furthermore, it is to be appreciated that the apparatus and method is not limited to pinch rollers. For example, as with the previous embodiment, a set of serpentine rollers or other like functioning elements could be employed in place of the pinch rollers.

The apparatus and method depicted in FIG. 3 also employs a heater element 55 on each side of the conventional sheet material, post liner removal, sourced from the middle master roll 41. As described with respect to the apparatus and method of FIG. 1, the heater element 55 is positioned to warm and thereby enhance the tackiness of the thermoset resin. In this case, the heater(s) is positioned to warm both surfaces of the sheet material. Of course, it is also to be appreciated that a heater element could also be employed with each of the other master sheet materials. Again, any heating is limited to improve the tackiness of the thermoset resin without initiating cure of the thermoset resin.

As previously noted, the three prepreg sheet materials are mated and pass through a pair of pinch rollers 53. Again, the pinch rollers help ensure proper face to face mating across the full width of the sheet materials and are spaced to provide a slight interference fit or may be constructed whereby a pressure is exerted by one roller relative to the other to press the mated layers into one another.

The resulting thick master sheet material 60 is shown in FIGS. 3A and 38 wherein a liner 62 is present on both surfaces of the thick master prepreg material 64. Although accentuated, FIG. 38 presents a cross-sectional view of the master tape wherein a distinct thermoset resin layer 65 is present intermediate each of the opposing resin infused unidirectional fiber layers 66.

Finally, as in FIG. 1, FIG. 3 shows the thick prepreg master sheet advancing to Box 18 for further processing. As previously mentioned, such further processing could be merely the winding of the thick prepreg master sheet on a core element to form a master roll, with or without removing one of the remaining support or liners. Alternatively, the thick prepreg master sheet material could be advanced to a slitting apparatus for converting the wide master sheet into a plurality of slit tapes of one or more widths. Further still, the master sheet could be advanced to a manufacturing process where the master sheet material is fed to an ATL apparatus or AFP apparatus, particularly one with an integrated slitter, for building a composite structure.

Figure 4:
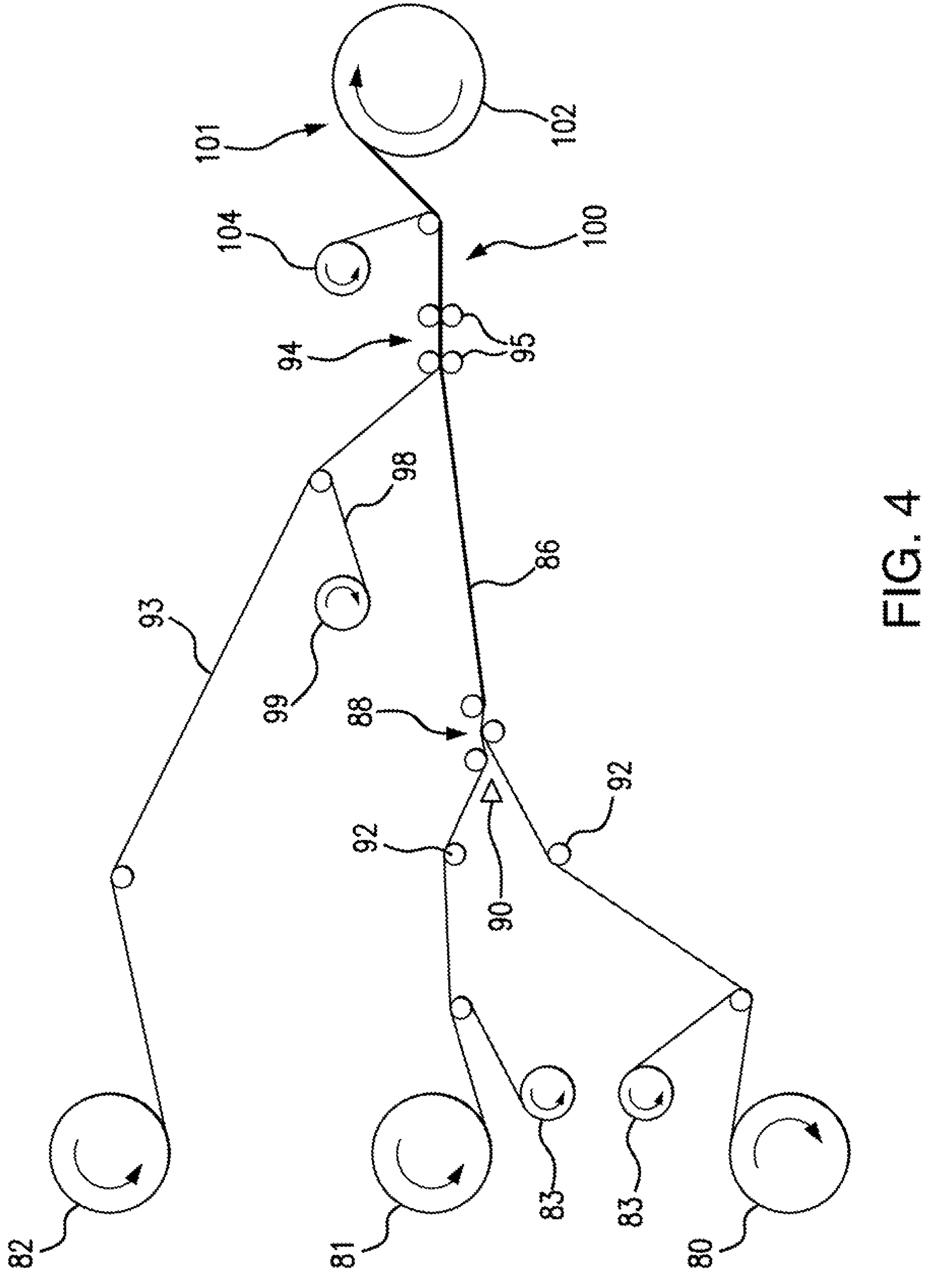
FIG. 4 is a schematic side view of an alternate apparatus for sequentially mating three continuous sheets of prepreg material with liner removal.

FIG. 4 presents a side-view schematic of an alternate apparatus and method for producing thick prepreg master sheet materials from three master rolls 80, 81, 82 of conventional prepreg sheet material 85. In this particular depiction, each of the conventional thermoset prepreg master sheet materials 85 has a liner 87 on both surfaces. Further this embodiment differs from the previous in that the build is a sequential build wherein an intermediate two layer thick prepreg sheet is formed and then a third layer mated to the intermediate prepreg sheet material.

In the iteration shown in FIG. 4, the two layered thick prepreg intermediate sheet 86 is formed as depicted in FIG. 2 wherein conventional prepreg sheet material is fed from two master rolls 80, 81 and the liner on the mating surface removed and taken up by liner winders 83 before the two sheets are mated at a serpentine roller assembly 88. Guide rollers 92 are employed to align the sheet materials for proper mating. In this particular embodiment, a heater 90 is also present to enhance the tackiness of the two surfaces to be mated.

The resulting thick prepreg intermediate master sheet 86 is then advanced to a set of pinch roller assemblies 94: in this case the pinch roller assembly comprises two pair of pinch rollers 95, to press the third sheet of prepreg sheet material 93 to the intermediate prepreg sheet material. In advance of this second mating point, the liner 98 on the mating surface of the third conventional prepreg master sheet material is removed and wound on liner winder 99 to expose the thermoset resin. As shown, the backing or liner is removed in close proximity to the mating point as this will reduce the opportunity for debris and other possible contaminants from settling on the surface of the thermoset resin prior to the mating. Of course, if desired one could remove the backing liner as the conventional master sheet material comes off the master roll 82 as with the other two master rolls.

As noted, this particular embodiment employs a pinch roller assembly 94 to mate the third master sheet material with the intermediate thick sheet material. Although not necessary, given the increased thickness of the thick prepreg master sheet material at this point, having two pair of pinch rollers 95 provides better certainty that air is not trapped and all the layers of the thick prepreg sheet material are firmly bonded to one another. Of course, other press means could be used as well such as a set of serpentine rollers, etc. Additionally, one could add a heater to heat the mating surface of the conventional prepreg sheet, of the intermediate thick prepreg sheet or both, to enhance tackiness.

In the depiction in FIG. 4, the resulting thick master sheet material 100 is advanced to a winder 101 for winding into a master roll 102 for subsequent use and/or processing. Of course, as noted before, the resulting thick master sheet material could be directly advanced for further processing and use as described above with respect to the Box 18 in FIGS. 1 and 3. Furthermore, in this instance, since both surfaces of the resulting thick master sheet material have a liner, one is removed and wound on liner winder 104 before actually winding the thick master sheet material.

Although each of the depicted embodiments show the conventional master sheet materials being fed from master rolls, it is also to be appreciated that the apparatus and processes described above could be integrated into a prepreg sheet manufacturing plant and process where each feed of conventional sheet material comes directly from its manufacture to the mating process. This allows for a continuous operation and process.

Alternatively, a continuous operation and process is provided by temporarily suspending the mating process when a master roll is expended to provide time to replace the expended roll with a new master roll. In these instances a splicer is also integrated into the apparatus and splicing operation into the process so that a continuous source of conventional master sheet material is attained. Splicers and splicing operations are conventional in the art and are, e.g., present in typical slitting apparatus and operations for forming slit tape. In those instances where a conventional splicing operation is integrated into the apparatus and process it is especially desirable to stagger the initial feed of conventional master sheet material into the mating section so as to avoid or lessen the chance that two splices will overlap in the mating operation. The stagger may be attained by initiating the feed of one conventional sheet material into the pinch rollers or serpentine rollers prior to advancing the other(s). Alternatively, one may attach a lead sheet material to one or more of the conventional sheet materials whereby when priming the apparatus for commercial production, all master sheet materials are started at once, but the use of the lead prevents the lead edge of prepreg materials arriving at the mating point at the same time.

The thick master sheet materials and slit tapes produced by the process of the present teaching allow for faster production of parts since one is laying substantially thicker sheets and tapes in the layup operation. Hence, fewer passes are needed to achieve the same part thickness when laying the thick prepreg sheets and tapes of the present teaching than with the conventional prepreg sheet and tapes from which they are produced. Of course, it is contemplated that any given AFP or ATL apparatus could also have multiple sources of slit tape, both those of conventional thickness and the enhanced thickness of the present sheet and tapes to control overall part thickness in accordance with their design specifications.

Following on the foregoing, another benefit of the present teaching is that one can customize the thickness of the thick prepreg master tapes to be produced. As noted above, issues with voids and wetting, among others, are associated with trying to produce conventional tapes of greater thicknesses. However, one can generally prepare sheets which are thinner without concern. In this respect, one can select and use conventional prepreg sheet materials of different thicknesses to build a thick prepreg master sheet material of a given or desired thickness in accordance with the present teachings. These thick prepreg sheets are thicker than attainable with conventional prepreg sheet materials and avoid or lessen the concern with voids and wetting, among other issues as noted. For example, when using a thermoset resin for which one can only attain a maximum thickness of 250 micrometers without a marked adverse effect on the resulting prepreg material, one could mate a prepreg sheet of 250 micrometers with another sheet of 100 micrometers to produce a thick prepreg sheet material of 350 micrometers thickness. These sheets would have characteristics relative to wetting and voids consistent with that of the starting materials, e.g., conventional sheets, from which they are formed, not as would be found if one attempted to produce such a thickness in a conventional sheet manufacture. Accordingly, from a general perspective, the present method and resulting thick prepreg sheet and slit tape materials have better and improved properties and characteristics, particularly from a fiber wetting and resin infiltration standpoint than sheet material and slit tape of the same thickness, particularly of the same and composition, made according to the conventional method.

In the foregoing description many embodiments and alternative iterations are discussed in terms of what one "could" do. It is to be noted that the use of the word "could" is not to be misconstrued as indicating or inferring that the subject matter is merely theoretical or nothing more than a supposition; rather, these are embodiments, iterations and alternatives that are fully contemplated and workable. Similarly, the methods and apparatus are presented with a number of interchangeable elements, e.g., the pinch rollers and the serpentine rollers as well as the box and the master roll winder; in these instances, the specification is to be read and understood as if each interchangeable element were in fact presented. Similarly, throughout the specification certain characteristics and properties of the various elements and process steps are presented in detail with one embodiment but not another, e.g., the temperature for the heating elements or the pressure for the pinch rollers or serpentine rollers thereof. In these instances, it is to be understood that the same characteristics and properties exist for each embodiment unless otherwise specifically mentioned. Generally speaking, it would be nearly impossible and, in any event, would take an extensive specification to describe each and every iteration or embodiment. Hence, one is to construe this specification as if each of the interchangeable element and properties has, in fact, been is specifically embodied.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. In following, true scope of the present teachings is defined by the claimed elements and any and all modifications, variations, or equivalents that fall within the spirit and scope of the underlying principles set forth herein.

I claim:

1. A method for the production of a continuous sheet or multiple strips of curable, unidirectional thermoset prepreg which method comprises:

A) i) feeding a curable thermoset prepreg component consisting of two or more continuous sheets of conventional curable thermoset prepreg, each with or without a liner or backing material on a surface thereof and each having a continuous length of at least 10 meters and at least one mating surface, said mating surface(s) being free of the liner or backing material, if present, to a mating point; ii) concurrently aligning the two or more continuous sheets of conventional curable thermoset prepreg, one over the other, along their length; iii) and mating the sheets along their mating surfaces to form a single continuous thick curable thermoset prepreg sheet material; and B) either iv) winding the continuous thick curable thermoset prepreg sheet material into a master roll, v) passing the continuous thick curable thermoset prepreg sheet material on to a manufacturing process for building a composite structure, vi) passing the continuous thick curable thermoset prepreg sheet material through a slitter to form continuous strips of the curable thermoset prepreg material which is then wound, or vii) passing the continuous thick curable thermoset prepreg sheet material through a slitter to form continuous strips of the curable thermoset prepreg material which are then passed on to a manufacturing process for building a composite structure: the conventional curable thermoset prepreg sheets characterized as comprising a plurality of parallel unidirectional fibers/fiber bundles infused with a curable thermosetting matrix resin wherein the fibers/fiber bundles are aligned along the length of the prepreg sheet.

2. The method of claim 1 wherein the mating surface of at least one of the continuous sheets of conventional curable thermoset prepreg material is heated to a temperature sufficient to enhance or create tackiness of the thermoset resin without curing of the thermoset resin prior to the mating.

3. The method of claim 2 where the mated sheets are subjected to pressure to press the sheets of the conventional curable thermoset prepreg material to one another.

4. The method of claim 1 where the mated sheets are subjected to pressure to press the sheets of the conventional curable thermoset prepreg material to one another.

5. The method of claim 1 wherein the continuous thick curable thermoset prepreg material is wound into a master roll.

6. The method of claim 1 wherein the continuous thick curable thermoset prepreg material is passed through a slitter to form a plurality of strips of the prepreg material, characterized as slit tape, each of which is then wound.

7. The method of claim 1 wherein the thickness of the resulting continuous thick curable thermoset prepreg material is reflective of the sum of the thicknesses of the individual sheets of conventional curable thermoset prepreg.

8. The method of claim 1 wherein the resulting continuous thick curable thermoset prepreg material has less voids and/or better wetting than a single continuous curable thermoset prepreg sheet material of the same thickness and composition made by the same method as used to make the conventional curable thermoset prepreg sheets used in the method of claim 1.

9. A master roll of a continuous thick curable thermoset prepreg material formed in accordance with the method of claim 5.

10. The master roll of claim 9 wherein the continuous thick curable thermoset prepreg sheet material has less voids and better wetting as compared to a single continuous curable thermoset prepreg master sheet material of the same thickness and composition made by the same method as used to make the conventional curable thermoset prepreg sheets used in the method of claim 5.

11. A continuous curable thermoset prepreg slit tape formed in accordance with the method of claim 6.

12. The slit tape of claim 11 wherein the continuous curable slit tape has less voids and better wetting as compared to a slit tape of the same thickness and composition made from a continuous curable thermoset prepreg sheet material made by the same method as used to make the conventional curable thermoset prepreg sheets used in the method of claim 6.

13. The method of claim 1 wherein the length of the continuous thick curable thermoset prepreg material is at least 25 meters.

14. The method of claim 1 wherein the thickness of the continuous conventional curable thermoset prepreg materials is from about 0.001" (25.4 μm) to about 0.015" (381 μm).

15. The method of claim 6 wherein the slit tapes have a length of at least 200 meters and are coil wound or transverse wound to form master rolls thereof.

16. The master roll of claim 9 wherein the thick curable thermoset prepreg is characterized as having upper and lower surfaces of a matrix resin and an inner region comprising a plurality of resin-infused unidirectional fibers or fiber bundle layers each separated by a matrix resin layer.

17. The method of claim 1 wherein the continuous thick thermoset prepreg material is passed through a slitter to form a plurality of strips of the prepreg material, characterized as slit tape, each of which is then advanced to an ATL apparatus or APP apparatus for production of a product.

18. The method of claim 1 wherein the curable thermoset prepreg materials are not heated to a temperature whereby cure is initiated.

19. The method of claim 1 wherein a liner or backing material is on the one or more mating surface(s) and the process further comprises the step of removing the liner or backing material to expose the mating surface(s) prior to the mating point.

20. The method of claim 1 wherein the thickness of the resulting prepreg material is greater than can be achieved in producing a single prepreg sheet by the same method as used to make the conventional curable thermoset prepreg sheets.

21. The master roll of claim 9 wherein the thickness of the resulting prepreg material is greater than can be achieved in producing a single prepreg sheet by the same method as used to make the conventional curable thermoset prepreg sheets.

22. The slit tape of claim 11 wherein the thickness of the resulting prepreg slit tape is greater than can be achieved in producing a single prepreg sheet by the same method as used to make the conventional curable thermoset prepreg sheets.

* * * * *